United States Patent
Dietz et al.

(10) Patent No.: US 7,933,886 B2
(45) Date of Patent: *Apr. 26, 2011

(54) SYSTEM FOR CONDUCTING SEARCHES ON THE WORLD WIDE WEB ENABLING THE SEARCH REQUESTER TO MODIFY THE DOMAIN CONTEXT OF A SEARCH RESPONSIVE TO AN EXCESSIVE NUMBER OF HITS ON COMBINATIONS OF KEYWORDS

(75) Inventors: Timothy Alan Dietz, Austin, TX (US); Walid M. Kobrosly, Round Rock, TX (US); Nadeem Malik, Austin, TX (US); Avijit Saha, Somers, NY (US)

(73) Assignee: Internation Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 12/187,796

(22) Filed: Aug. 7, 2008

(65) Prior Publication Data

US 2008/0294635 A1 Nov. 27, 2008

Related U.S. Application Data

(63) Continuation of application No. 10/682,397, filed on Oct. 9, 2003, now Pat. No. 7,447,688.

(51) Int. Cl.
*G06F 17/30* (2006.01)
*G06F 7/00* (2006.01)
(52) U.S. Cl. .................................... 707/706; 707/722
(58) Field of Classification Search .................. 707/706, 707/722
See application file for complete search history.

*Primary Examiner* — Jacob F Bétit
(74) *Attorney, Agent, or Firm* — J. B. Kraft; Steven L. Benneti

(57) ABSTRACT

The user requesting the search is enabled to analyze the list of excessive hits in a manner organized through a Web content manager on the user's display screen, and reduce the excessive hits through the elimination of extraneous domains or subdomains captured by the search.

An implementation for reducing an excessive number of hits in a search result received at one of the receiving display stations on the Web comprising conventional means for displaying at said receiving display station, Web documents received from sources on the Web, and means for conducting keyword searches on the Web. There are means associated with the receiving display stations for displaying the number of Web documents hit by said keyword searches, together with means, responsive to an excessive number of Web document hits, for enabling a user to display a hierarchical level of the domains of the Web documents hit by said searches with a count of the number of hits for each domain, and means enabling the user to interactively eliminate selected domains to thereby reduce the excess number of hits in said search.

11 Claims, 7 Drawing Sheets

SYSTEM FOR CONDUCTING SEARCHES ON THE WORLD WIDE WEB ENABLING THE SEARCH REQUESTER TO MODIFY THE DOMAIN CONTEXT OF A SEARCH RESPONSIVE TO AN EXCESSIVE NUMBER OF HITS ON COMBINATIONS OF KEYWORDS

TECHNICAL FIELD

The present invention relates to computer managed communication networks such as the World Wide Web (Web) and particularly to implementations for simplifying keyword searches done on the Web.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct links between pages and other documentation on the Web and a variety of related data sources that were at first text and images, e.g. both JPEG and MPEG, and then evolved into media, i.e. "hypermedia". Web documents may also include applets and other programming routines. (The term Web documents as used herein is meant to include all such data documents). This even further exploded the use of the Internet or Web.

A major problem encountered by all Web users is the amount of wasted time that the user spends in misdirection, e.g. the "blind alleys" that the user often traverses in trying to get to an appropriate Web site or Web document. It is clearly in the interest of all businesses and organizations that use the Web to have their customers and clients reach their intended destinations on the Web as expeditiously and quickly as possible.

A significant source of this time waste is in the Web page (the basic document page of the Web) itself. In the case of Web pages, we do not have the situation of a relatively small group of professional designers working out the human factors. Rather, in the era of the Web, anyone and everyone can design a Web page. Pages are frequently designed by developers without usability skills. As a result, Web pages are frequently set up and designed in an eclectic manner. Often Web pages are set up through loose business, professional, social and educational configurations with general trade or public input of Web pages.

Due in part to this divergence in Web page or document creation, it is very often the case that terms and words used in these Web documents may have multiple meanings in different industries, businesses, technologies and arts. Consequently, when conventional keyword searches are done on the search engines, they go to a database or source domains on the Web, and even data source paths within such domains that have virtually nothing to do with the subject matter that the requesting user had intended to search. It is not unusual for any search submitting a combination of two or three words to receive a search result with tens of thousands of terms because of term similarities in many industries, businesses and technologies. For example, if a user wishes to search for film coating decay in the preservation of motion picture films, he is likely to come up with over 130,000 hits from the motion picture industry and fruit growing, dentistry and liquid pipe erosion.

Past expedients for reducing such numbers of excessive hits have included increasing the numbers of keywords in the search statement which has the danger of making the search too restrictive. Also, an exclusion list of words may be provided by the user. This likewise may be too restrictive. Further, this exclusion list must be repeated in each subsequent search using a combination of keywords.

SUMMARY OF THE PRESENT INVENTION

The present invention provides a method, system and program that permits the user requesting the search to analyze the list of excessive hits in a manner organized through a Web content manager on the user's display screen and reduce the excessive hits through the elimination of extraneous domains or subdomains captured by the search.

Accordingly, the present invention comprises an implementation for reducing an excessive number of hits in a search result received at one of the receiving display stations on the Web comprising conventional means for displaying at said receiving display station Web documents received from sources on the Web, and means for conducting keyword searches on the Web. There are means associated with the receiving display stations for displaying the number of Web documents hit by the keyword searches, together with means, responsive to an excessive number of Web document hits, for enabling a user to display a hierarchical level of the domains of the Web documents hit by said searches with a count of the number of hits for each domain, and there are also means enabling the user to interactively eliminate selected domains to thereby reduce the excess number of hits in said search. There is a further implementation, subsequent to the above-described elimination of selected domains, for reconducting the initial keyword search.

The searching user may be further enabled to display a hierarchy of several domain levels with a count of the number of hits for each domain in each domain level. These means also enable the user to interactively eliminate selected domains in each domain level. There may be further means for storing, in association with the receiving display station, a search context including said eliminated selected domains whereby the selected domains may be eliminated from subsequent searches. Then, a subsequent search may be conducted on the Web with the stored search context but with keywords different from the keywords in the original Web search.

Also, there is preferably a Web browser associated with a receiving display station and including the means for displaying at said receiving display stations, Web documents received from said sources, the means for conducting keyword searches on the Web, the means associated with said receiving display stations for displaying the number of Web documents hit by said keyword searches, the means, responsive to an excessive number of Web document hits, for enabling a user to display a hierarchical level of the domains of the Web documents hit by said searches with a count of the number of hits for each domain, the means enabling the user to interactively eliminate selected domains to thereby reduce the excess number of hits in said search, and the means for storing a search context including said eliminated selected domains whereby said selected domains may be eliminated from subsequent searches. For best results, the system should include a Web server for connecting said receiving display station to the Web; and said means for storing a search context including said eliminated selected domains is operatively associated with said Web server.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
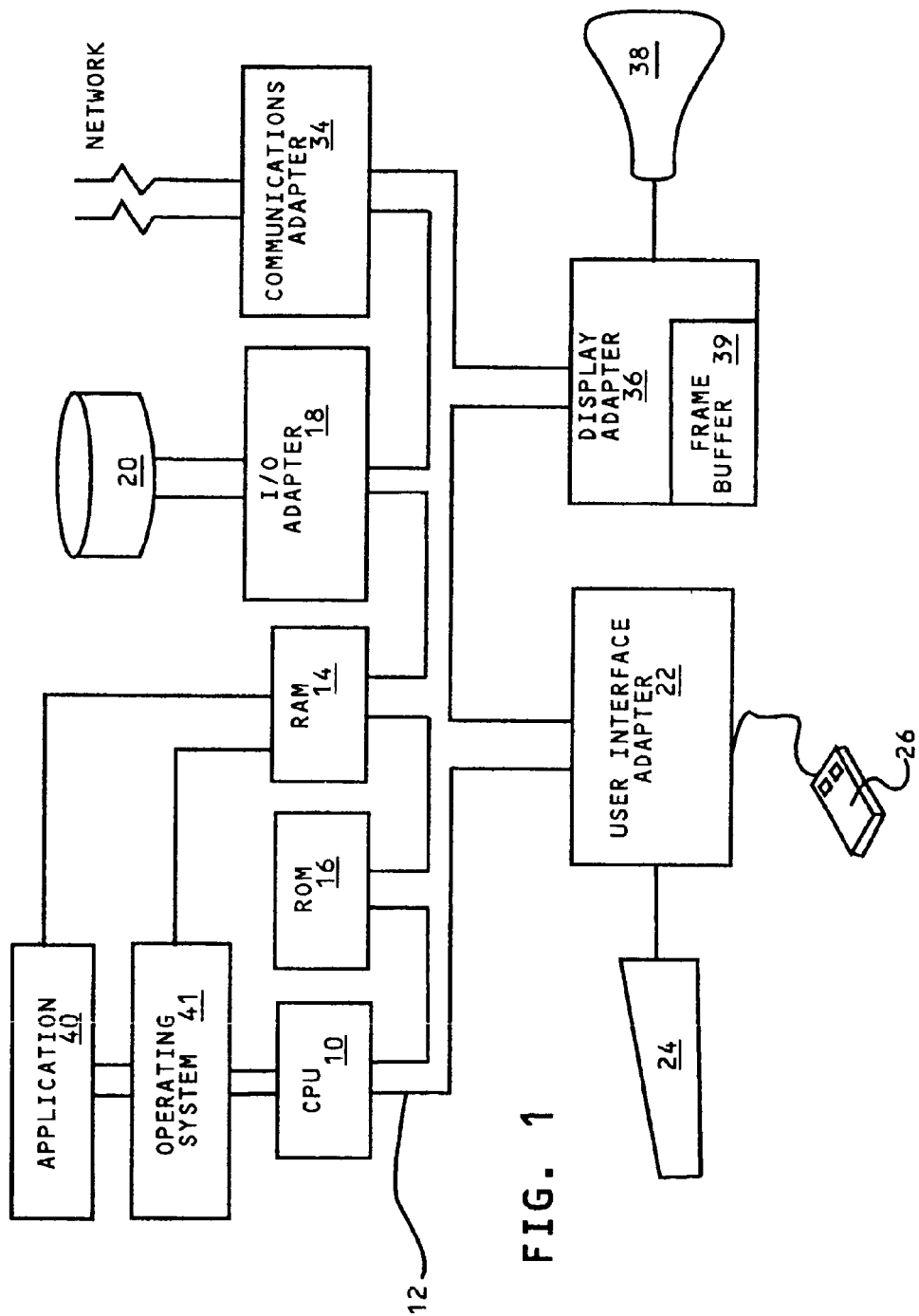
FIG. 1 is a block diagram of a data processing system including a central processing unit and network connections via a communications adapter that is capable of functioning both as a display computer for a receiving Web station and as the Web server.

Referring to FIG. 1, a typical data processing terminal is shown that may function as a basic computer controlled Web receiving terminal used in implementing the present invention for displaying and examining search results and reducing the search context of Web domains searched whenever the number of Web documents hits is excessive and must be reduced. The system may also be used for conventional servers used throughout the Web for Web access servers, source database servers. The system may function as the Web servers used by the service providers in accordance with this invention to modify the context of searches relative to the domains searched, and to store such modified search contexts as to be usable in subsequent keyword searches, as will be hereinafter described in greater detail. A central processing unit (CPU) 10, such as one of the PC microprocessors or workstations, e.g. RISC System/6000™ series available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WindowsXP™ or Windows2000™, as well as UNIX and other IBM AIX operating systems. Application programs 40, controlled by the system, are moved into and out of the main memory Random Access Memory (RAM) 14. These programs include the programs of the present invention that will hereinafter be described for operations wherein the system of FIG. 1 functions as the Web server used by the service providers in accordance with this invention in reducing the scope or context of the searches. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of this invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to documents, such as Web pages and media content therein, transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996.

The Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics, other images and audio. This displayable information may be still, in motion or animated, e.g. animated GIF images.

Web documents are conventionally implemented in HTML language, which is described in detail in the text entitled *Just Java*, van der Linden, 1997, SunSoft Press, particularly at Chapter 7, pp. 249-268, dealing with the handling of Web pages; and also in the above-referenced *Mastering the Internet*, particularly at pp. 637-642, on HTML in the formation of Web pages. In addition, aspects of this description will refer to Web browsers. A general and comprehensive description of browsers may be found in the above-mentioned *Mastering the Internet* text at pp. 291-313. More detailed browser descriptions may be found in the text *Internet: The Complete Reference, Millennium Edition*, Young et al., 1999, Osborne/McGraw-Hill: Chapter 19, pp. 419-454, on the Netscape Navigator; Chapter 20, pp. 455-494, on the Microsoft Internet Explorer; and Chapter 21, pp. 495-512, covering Lynx, Opera and other browsers.

In the description of the invention, search engines will be used to locate and pre-access the previously accessed Web documents stored at the receiving display stations. As described in the above-mentioned *Internet: The Complete Reference, Millenium Edition* text, pp. 395 and 522-535, search engines use keywords and phrases to query the Web for desired subject matter. In carrying out its search, the search engine looks through the database for matches to keywords subject to the engine syntax. The search engine then presents to the user a list of the Web pages it determines to be closest to the requested query. Some significant search engines are: AltaVista, Infoseek, Lycos, Magellan, Webcrawler and Yahoo.

Figure 2:
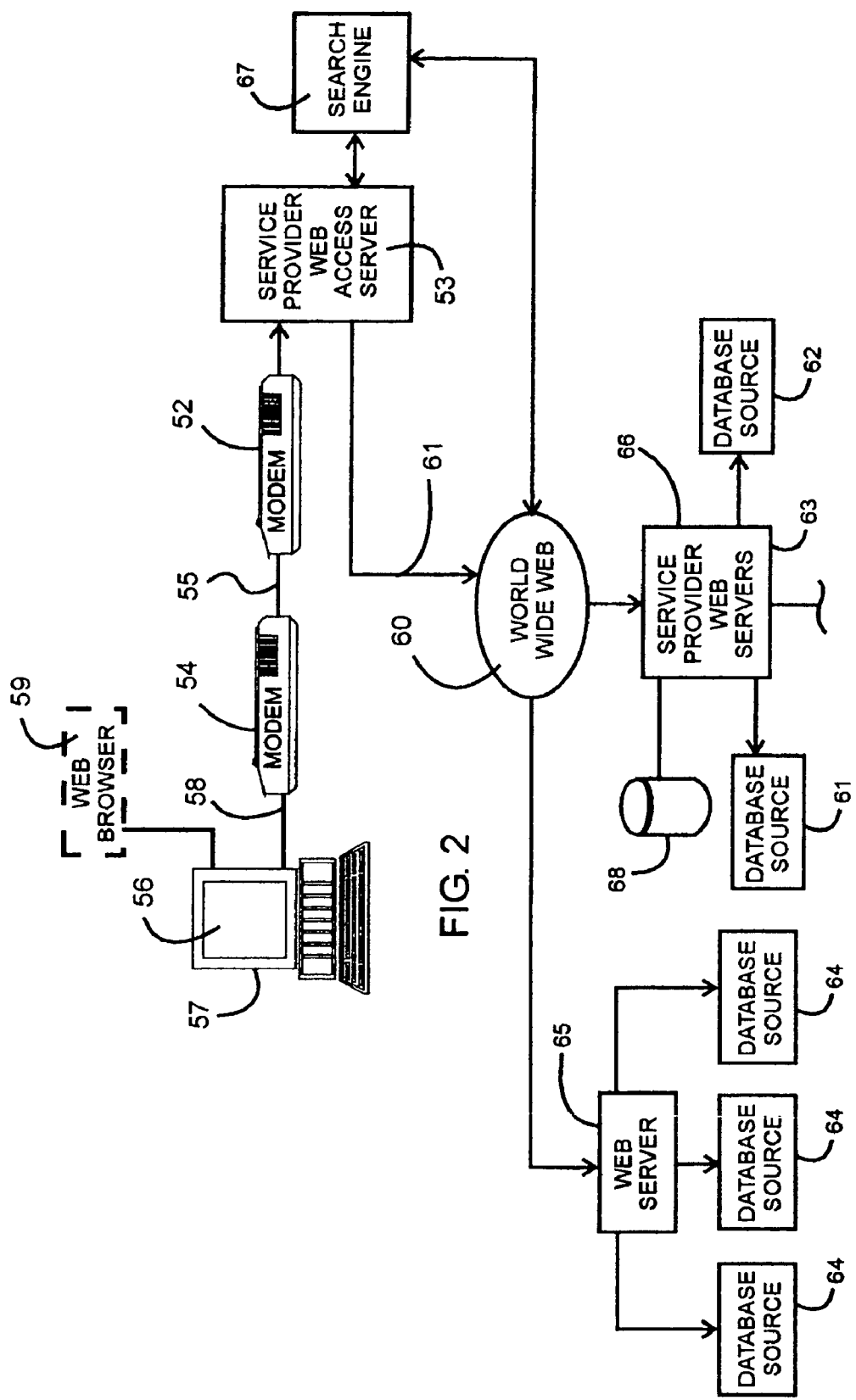
FIG. 2 is a generalized diagrammatic view of a Web portion showing the elements implementing the present invention of permitting the user requesting the search to analyze the list of excessive hits in a manner organized through a Web content manager on the user's display screen, and reduce the excessive hits through the elimination of extraneous domains.

A generalized diagram of a portion of the Web in which the computer controlled display terminal 57 used for Web page receiving during searching or browsing is connected as shown in FIG. 2. Computer display terminal 57 may be implemented by the computer system set up in FIG. 1 and connection 58 (FIG. 2) is the network connection shown in FIG. 1. For purposes of the present embodiment, computer 57 serves as the receiving Web display station that will access Web documents, e.g. pages that are displayed 56. Reference may be made to the above-mentioned *Mastering the Internet*, pp. 136-147, for typical connections between local display stations to the Web via network servers; any of which may be used to implement the system on which this invention is used. The system embodiment of FIG. 2 has a host-dial connection. Such host-dial connections have been in use for over 30 years through network access servers 53 that are linked 61 to the Web 60. The Web servers 53 that also may have the computer structure described with respect to FIG. 1, may be maintained by a Web Service Provider to the client's display terminal 57. Such Web or Internet Service Providers (ISPs) are described generally in the above-mentioned text, *Internet: The Complete Reference, Millenium Edition* at pages 14-18. The Web server 53 is accessed by the client receiving terminal 57 through a normal dial-up telephone linkage 58 via modem 54, telephone line 55 and modem 52. Any conventional digital or analog linkages, including wireless connections, are also usable. The previously described search engines 67 contacted conventionally via Web access servers search the Web and send the selected Web documents back to the receiving display station 57 on which they may be conventionally displayed on a real-time basis. As will be hereinafter described in greater detail, many of the functions of a receiving display station 57 with respect to the Web may be carried out by a Web browser program 59 associated with the station.

The Web documents are accessed from the Web database sources 64 through appropriate Web database access servers 65. Other database sources, such as sources 61 and 62, may be accessed through Web servers 66.

Figure 3:
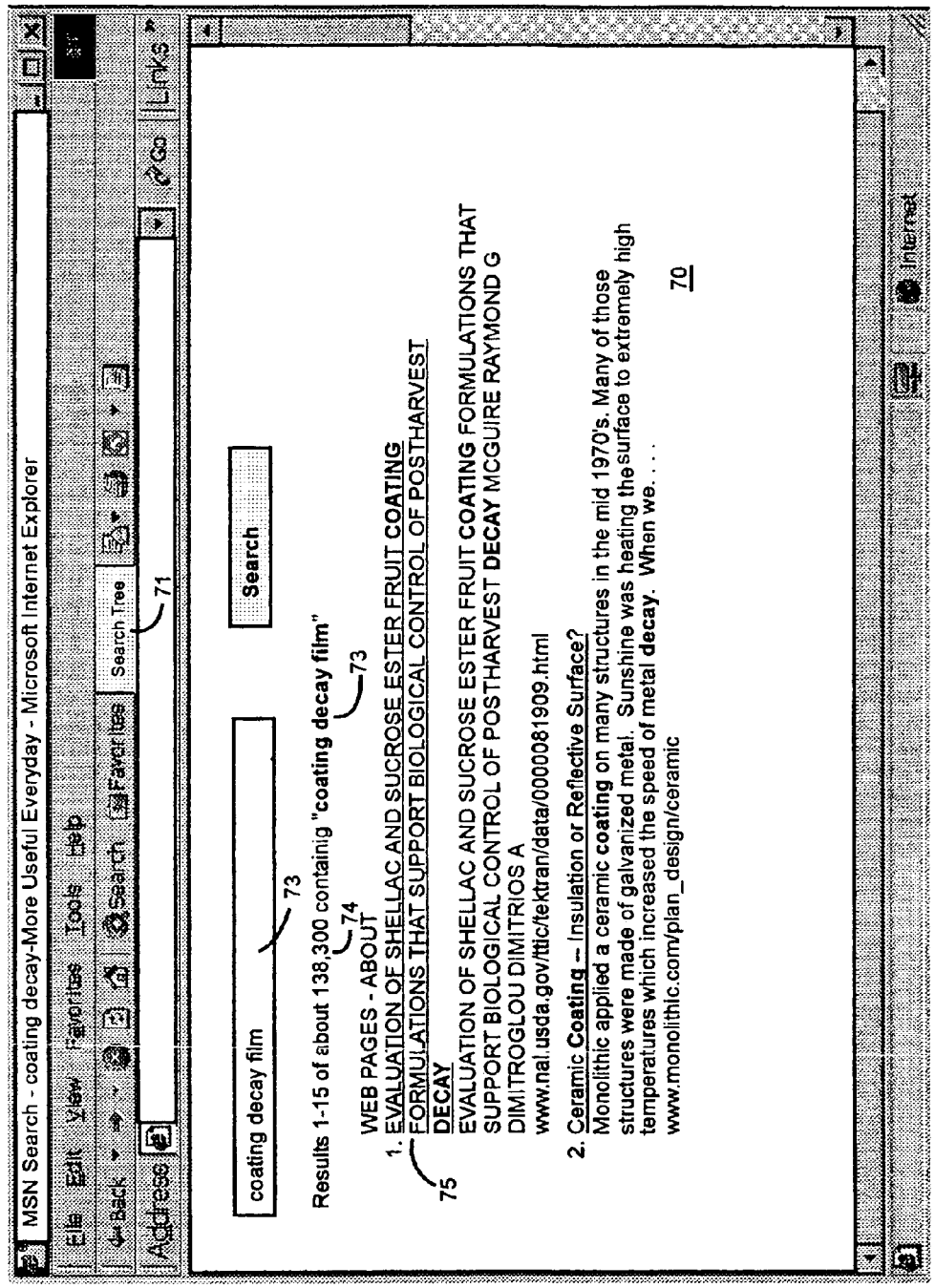
FIG. 3 is a diagrammatic illustration of a display screen showing an initial partial listing of the Web document found in the search including the total number of hits.
Figure 4:
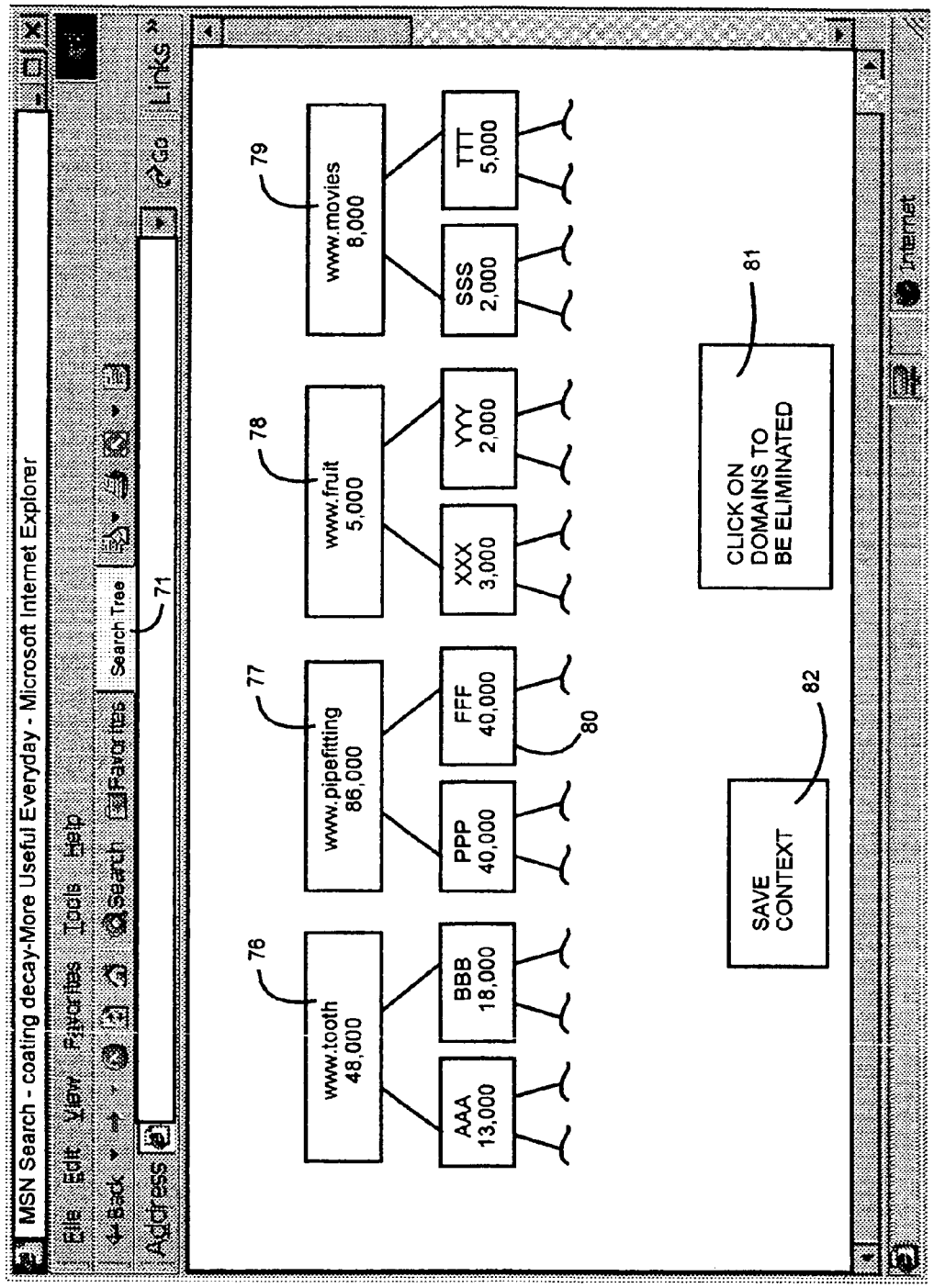
FIG. 4 is a diagrammatic illustration of a display screen showing the hierarchical tree of the domains and paths in the search results showing the number of hits in each domain or subdomain.
Figure 5:
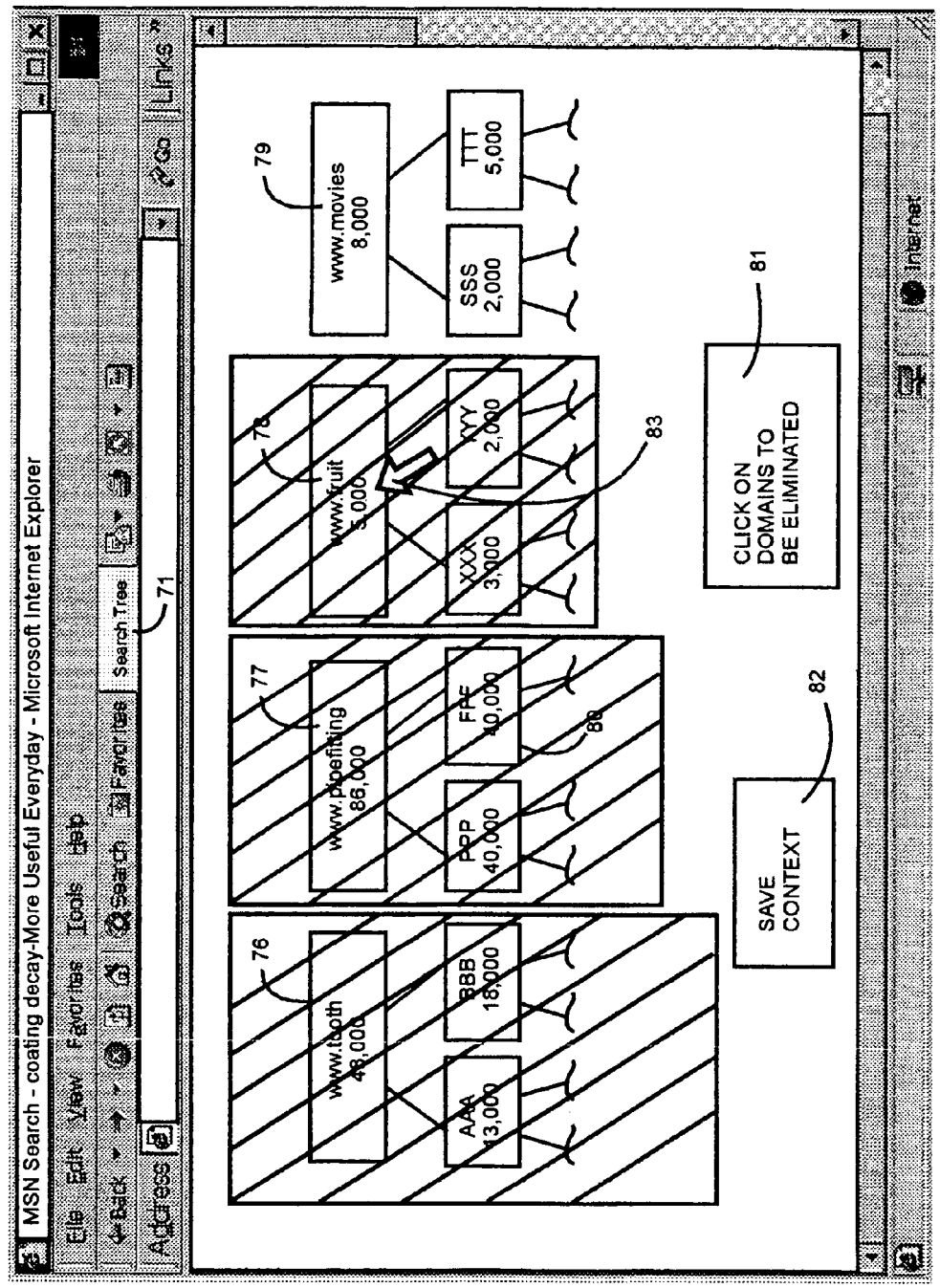
FIG. 5 is the display screen of FIG. 4 after the user has selectively eliminated several domains from the search context.

Now, with respect to FIGS. 3 through 5, we will provide an illustrative example of how the present invention may be used to reduce Web search contexts to eliminate domains of lesser or no interest whenever a keyword search provides an excessive number of hits. Web page list 70, FIG. 3, is an illustration of the displayed list of Web documents conventionally presented to the user at the receiving display station setting forth search results. In the illustrative example shown, the user who is interested in motion picture film preservation has searched the Web with the combination of keywords "coating", "film" and "decay" 73. Unfortunately, the search has resulted in 138,000 hits, 74 for this combination of terms. Obviously, this is much more than the user can handle. In accordance with the invention, he needs to get a better understanding of the domains and subdomains of the Web databases covered by the search so that he may reduce the search context by eliminating some of the domains. With his cursor or pointer, he clicks on button 71, "Search Tree", and is presented with the display screen of FIG. 4 that shows a search tree or hierarchy showing all of the domains: 76, 77, 78 and 79 included in the search, as well as their respective subdomains 80. For each domain and subdomain, the number of Web document or page hits is shown. The domain tree shown in FIG. 4 on the receiving user's display station may be organized on the Web server 53 serving the display station. The dynamic organization of such a presentation may be done using a Web content manager program, such as those distributed by Interwoven Inc. or the IBM Content Manager Express server program for dynamic Web content management. The various search programs described above, of course, track the source domains of their hits and the content manager program can be set up with a program as will hereinafter be described for presenting the hit tree shown in FIG. 4. The user is prompted by dialog 81 to examine the tree and to eliminate domains from the search context.

Accordingly, FIG. 5, the user who is interested in motion picture film preservation has examined the domain tree and has clicked with his cursor 83 to eliminate the "Tooth" 76, "Pipefitting" 77 and "Fruit" 78 domains as shown by hatched lines so that the modified context of the search only includes the "Movies" 79 domain. Although not illustrated with respect to FIG. 5, it is possible to individually eliminate one or more of the subdomains. In this regarded, subdomains are conventionally noted in sections succeeding the domain in the URL http path definition, e.g. any database source levels in this path definition are the equivalent of subdomains in defining the present invention. Upon the selection of domains to be eliminated as shown, the user may click onto button 82 to save the search context for future searches. Such a saved context may be saved in connection with the Web server or as the receiving display station that requested the search.

Figure 6:
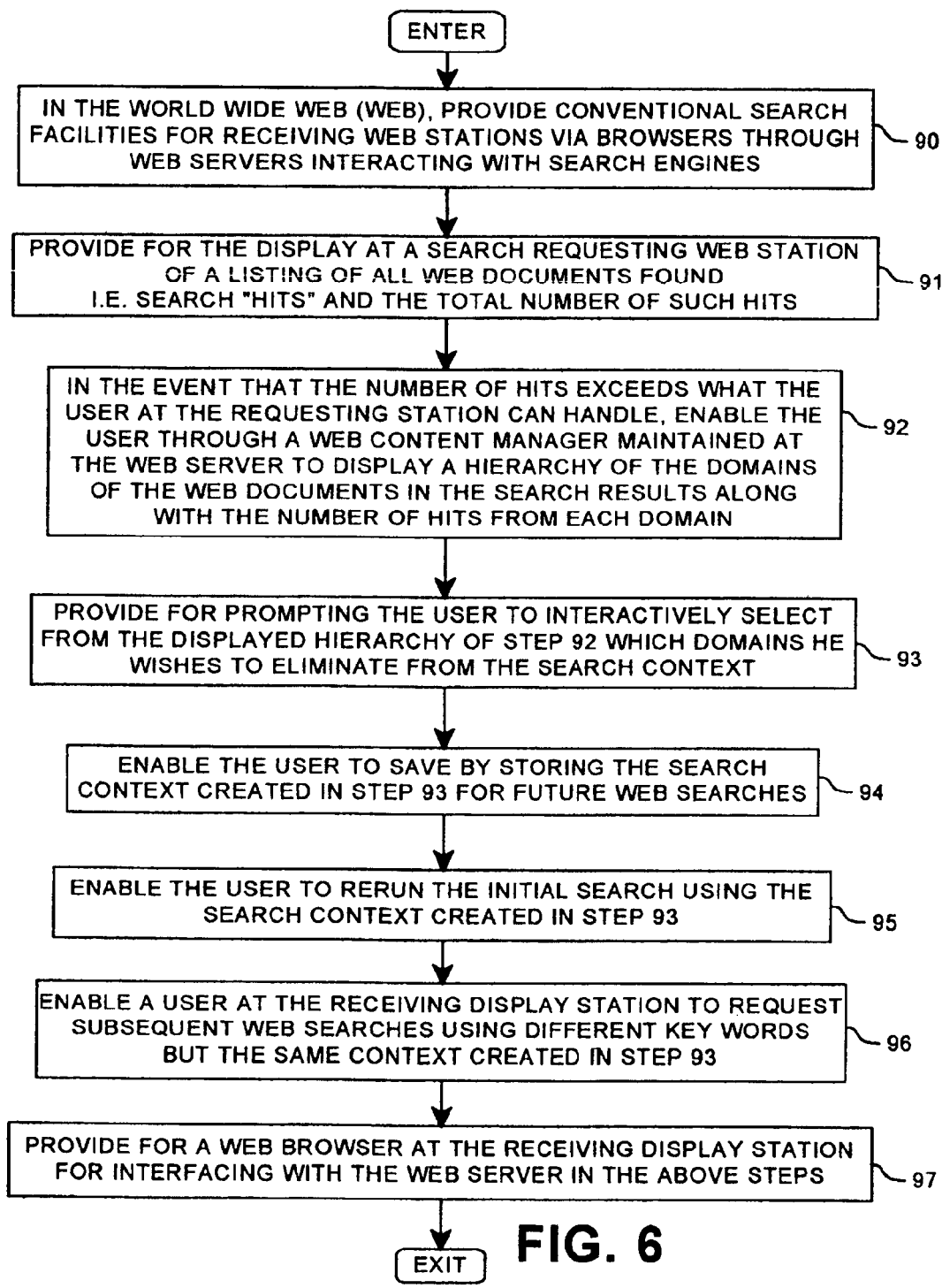
FIG. 6 is an illustrative flowchart describing the setting up of the elements of a program according to the present invention for eliminating domains from the search context when an excessive number of hits occurs.

FIG. 6 is a flowchart showing the development of a process according to the present invention for reducing an excessive number of hits in a search result received at a receiving display Web station. Most of the programming functions in the process of FIG. 6 have already been described in general with respect to FIGS. 3 through 5. A Web browser is provided at a receiving display station on the Web for accessing Web pages in the conventional manner and loading them at the display station, step 90. The Web pages are conventionally obtained via a Web server provided by an ISP. The Web browser has the capability of requesting searches from one or more search engines available through the Web. Conventional capability is provided at the display station requesting the search to list sequentially all Web documents found in the search, and to provide the total number for these hits, step 91. In the event that the user finds that this total number of hits exceeds what the user can handle, the user is enabled, through a previously described Web content manager program preferably maintained at the Web server, to display a hierarchy of domains of the Web documents found in the search along with the number of hits from each domain, step 92, as shown in FIGS. 4 and 5. Provision is made for the prompting of the user to interactively select from the displayed hierarchy in step 92 which domains the user wished to eliminate from the search context, step 93. The user is also enabled to save the search context created in step 93 for future Web searches, step 94. The user is also enabled, step 95, to rerun the initial search using the search context created in step 93. In addition, the user at the receiving station may request, step 96, that all subsequent Web searches that may use different keywords still use the same search context created in step 93. Finally, provision is made for the Web browser at the receiving display station to interface with the Web server in the execution of the above steps.

Figure 7:
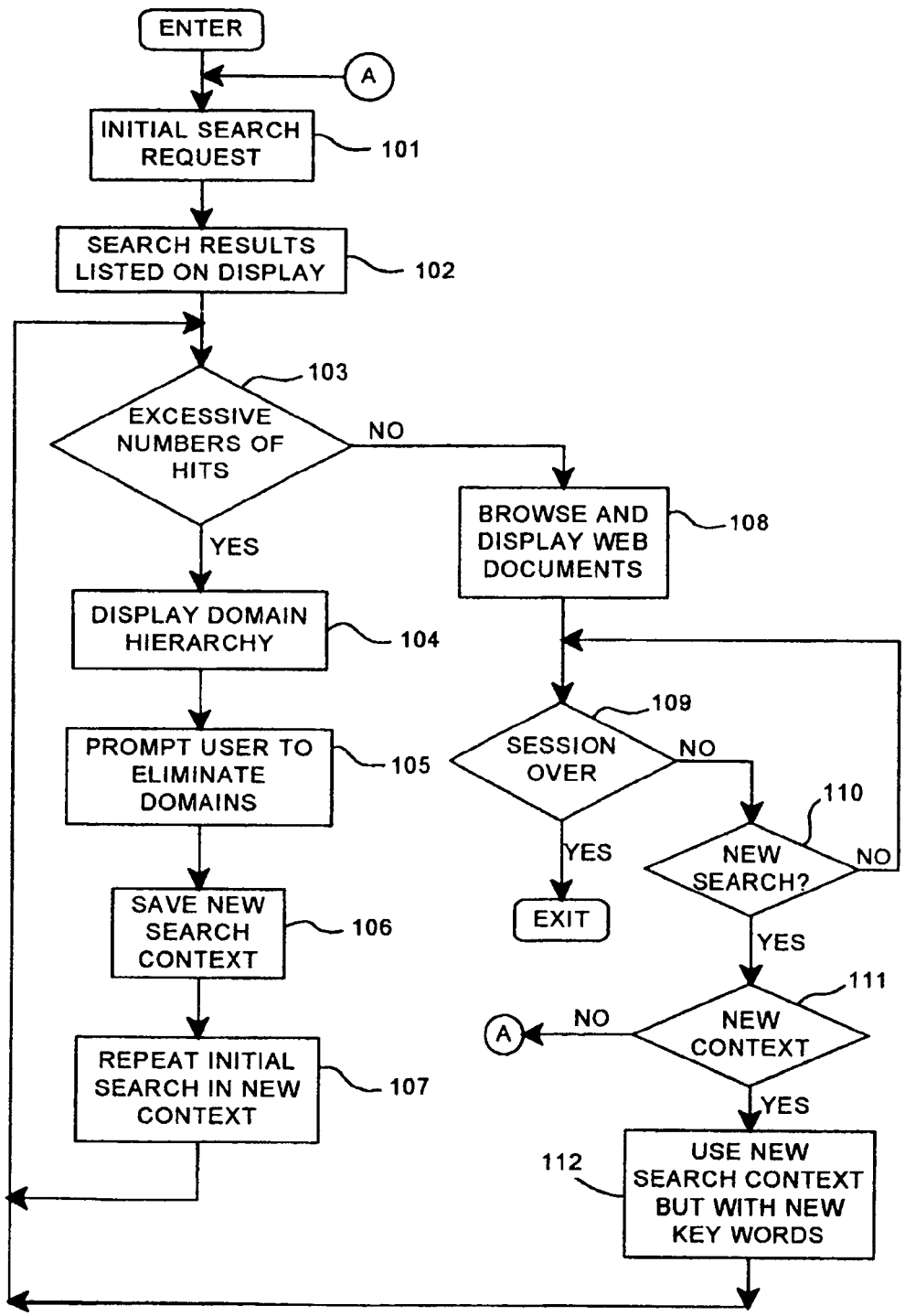
FIG. 7 is a flowchart of an illustrative run of the program set up in FIG. 6.

The running of the process set up in FIG. 6 and described in connection with FIGS. 3 through 5 will now be described with respect to the flowchart of FIG. 7. Let us assume that we are in a Web browsing session through the browser. The flowchart represents some steps in a routine that will illustrate the operation of the invention. An initial search is requested by a receiving display station on the Web via its Web browser and the Web server for the receiving station, step 101. The search results are listed, step 101, and the number of hits totaled, as in FIG. 3. A determination is made as to whether the number of hits is excessive, step 103. If No, then the listed Web documents are conventionally browsed through and displayed, step 108. If Yes, the number of hits is determined to be excessive, then a domain hierarchy is displayed, step 104, as in FIG. 4. The user is prompted to selectively eliminate some of the domains, step 105, and the resulting search context is saved as a new search context, step 106. The initial search is then repeated but using the new search context, step 107, and the process is returned to step 103 where a redetermination is made as to excessive number of hits.

After step 108, a determination may be conveniently made as to whether the session is over. If Yes, the session is exited. If No, a determination is made as to whether a new search is to be made. If No, the process is returned to step 109. If the decision is Yes, a new search is to be made, then a further determination is made as to whether the search is to be made in the new context resulting from the previous eliminations of domains, step 111. If No, then the process is returned via branch "A" to initial step 101. If Yes, then this new modified search context is used but with new or different keywords, step 112, in conducting a search. Upon the completion of this search, the process is returned to step 103 where the search result including the number of hits is viewed.

Although certain preferred embodiments have been shown and described, it will be understood that many changes and modifications may be made therein without departing from the scope and intent of the appended claims.

What is claimed is:

1. A computer controlled system for reducing an excessive number of hits in a search result received at one of the receiving display stations in a Web communication network with user access via a plurality of data processor controlled interactive receiving display stations for displaying received Web documents accessible from database sources on the Web, said system comprising:
    a processor; and
    a computer memory holding computer program instructions which when executed by the processor perform the method comprising:
    displaying at said receiving display stations, received Web documents received from said sources;
    conducting keyword searches on the Web;
    displaying at said receiving display stations the number of Web documents hit by said keyword searches;
    responsive to a number of Web document hits predetermined to be excessive, enabling a user to display a hierarchical level of the domains of the Web documents hit by said searches with a count of the number of hits for each domain;
    enabling the user to interactively eliminate selected domains to thereby reduce the excess number of hits in said search; and
    storing, in association with said receiving display station, a search context including said eliminated selected domains wherein said selected domains may be eliminated from subsequent searches.

2. The system of claim 1, wherein the performed method further includes reconducting said keyword search with said excessive number of hits subsequent to the elimination of selected domains.

3. The system of claim 2, wherein, in the performed method:
    said step of enabling a user to display a hierarchical level of the domains of the Web documents hit by said searches enables the display of a hierarchy of several domain levels with said count of the number of hits for each domain in each domain level; and
    said step of enabling the user to interactively eliminate selected domains enables the user to eliminate selected domains in each domain level.

4. The system of claim 1, wherein the performed method further includes conducting one of said subsequent searches on the Web with said stored search context but with keywords different from the keywords in the original Web search.

5. The system of claim 1, wherein the performed method further includes a Web browsing process at said receiving display station including:
    displaying at said receiving display stations, Web documents received from said sources;
    conducting keyword searches on the Web;
    displaying at said receiving display stations, the number of Web documents hit by said keyword searches;
    enabling a user to display a hierarchical level of the domains of the Web documents hit by said searches with a count of the number of hits for each domain;
    enabling the user to interactively eliminate selected domains to thereby reduce the excess number of hits in said search; and
    storing a search context including said eliminated selected domains whereby said selected domains may be eliminated from subsequent searches.

6. The system of claim 1, wherein the performed method further includes storing a search context including said eliminated selected domains in association with a Web server for connecting the receiving display station to the Web.

7. A computer usable storage medium having stored thereon a computer readable program for reducing an excessive number of hits in a search result received at one of the receiving display stations in a Web communication network with user access via a plurality of data processor controlled interactive receiving display stations for displaying received Web documents accessible from database sources on the Web, wherein the computer readable program when executed on a computer causes the computer to:
    display at said receiving display stations, received Web documents received from said sources;
    conduct keyword searches on the Web;
    display at said receiving display stations the number of Web documents hit by said keyword searches;
    responsive to a number of Web document hits predetermined to be excessive, enable a user to display a hierarchical level of the domains of the Web documents hit by said searches with a count of the number of hits for each domain;

enable the user to interactively eliminate selected domains to thereby reduce the excess number of hits in said search; and store, in association with said receiving display station, a search context including said eliminated selected domains wherein said selected domains may be eliminated from subsequent searches.

8. The computer usable storage medium of claim 7, wherein the computer program when executed on a computer further causes the computer to reconduct said keyword search with said excessive number of hits subsequent to the elimination of selected domains.

9. The computer usable storage medium of claim 8, wherein, the computer program when executed on a computer causes the computer to:

enable a user to display a hierarchical level of the domains of the Web documents hit by said searches enabling the display of a hierarchy of several domain levels with said count of the number of hits for each domain in each domain level; and enable the user to interactively eliminate selected domains by enabling the user to eliminate selected domains in each domain level.

10. The computer usable storage medium of claim 7, wherein the computer program when executed on a computer further causes the computer to conduct one of said subsequent searches on the Web with said stored search context but with keywords different from the keywords in the original Web search.

11. The computer usable storage medium of claim 7, wherein the computer program further includes a Web browsing routine, performed at said receiving display station, which causes the computer to:

display at said receiving display stations, Web documents received from said sources;

conduct keyword searches on the Web;

display at said receiving display stations, the number of Web documents hit by said keyword searches;

enable a user to display a hierarchical level of the domains of the Web documents hit by said searches with a count of the number of hits for each domain;

enable the user to interactively eliminate selected domains to thereby reduce the excess number of hits in said search; and store a search context including said eliminated selected domains whereby said selected domains may be eliminated from subsequent searches.

* * * * *